US009408185B2

(12) United States Patent
Kim et al.

(10) Patent No.: US 9,408,185 B2
(45) Date of Patent: Aug. 2, 2016

(54) METHOD AND APPARATUS FOR DETERMINING OPERATING MODE OF DEVICE IN WIRELESS COMMUNICATION SYSTEM

(71) Applicant: LG Electronics Inc., Seoul (KR)

(72) Inventors: Eunsun Kim, Gyeonggi-do (KR); Yunjung Yi, Gyeonggi-do (KR); Byounghoon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 14/356,954

(22) PCT Filed: Nov. 6, 2012

(86) PCT No.: PCT/KR2012/009278
§ 371 (c)(1),
(2) Date: May 8, 2014

(87) PCT Pub. No.: WO2013/069945
PCT Pub. Date: May 16, 2013

(65) Prior Publication Data
US 2014/0321409 A1    Oct. 30, 2014

Related U.S. Application Data

(60) Provisional application No. 61/556,830, filed on Nov. 8, 2011.

(51) Int. Cl.
*H04W 4/00* (2009.01)
*H04W 72/02* (2009.01)
*H04W 16/14* (2009.01)
*H04W 4/02* (2009.01)
*H04W 88/06* (2009.01)
*H04W 48/18* (2009.01)

(52) U.S. Cl.
CPC ............ *H04W 72/02* (2013.01); *H04W 4/02* (2013.01); *H04W 16/14* (2013.01); *H04W 88/06* (2013.01); *H04W 48/18* (2013.01)

(58) Field of Classification Search
CPC ....... H04W 72/02; H04W 4/02; H04W 48/18; H04W 16/14; H04W 88/06
USPC .......................................... 370/329
See application file for complete search history.

(56) References Cited

U.S. PATENT DOCUMENTS

| 2011/0268095 A1 | 11/2011 | Kim et al. |
| 2012/0129467 A1* | 5/2012 | Wang ............ H04W 16/14 455/67.14 |

(Continued)

FOREIGN PATENT DOCUMENTS

| WO | 2011/102652 A2 | 8/2011 |
| WO | 2011/136560 A2 | 11/2011 |

OTHER PUBLICATIONS

International Search Report and Written Opinion issued in corresponding International Patent Application No. PCT/KR2012/009278 dated Feb. 27, 2013.

*Primary Examiner* — Sai-Ming Chan
(74) *Attorney, Agent, or Firm* — Morgan, Lewis & Bockius LLP

(57) ABSTRACT

The present invention relates to a wireless communication system, and more specifically, to a method and apparatus for determining an operating mode of a device. A method for switching an operating mode of a device from a white-space bandwidth according to one embodiment of the present invention comprises the steps of: starting a timer related to database access if the device is operating in a first operating mode; determining whether a message is received from the database while the timer is in operation; and switching to a second operating mode if a message is not received from the existing database and the timer has expired.

12 Claims, 10 Drawing Sheets

(56) References Cited

U.S. PATENT DOCUMENTS

2012/0258670 A1* 10/2012 Gossain ............... H04B 17/27 455/67.11
2013/0109403 A1 5/2013 Kim et al.
2014/0254558 A1* 9/2014 Kasslin ................ H04W 48/18 370/331

* cited by examiner

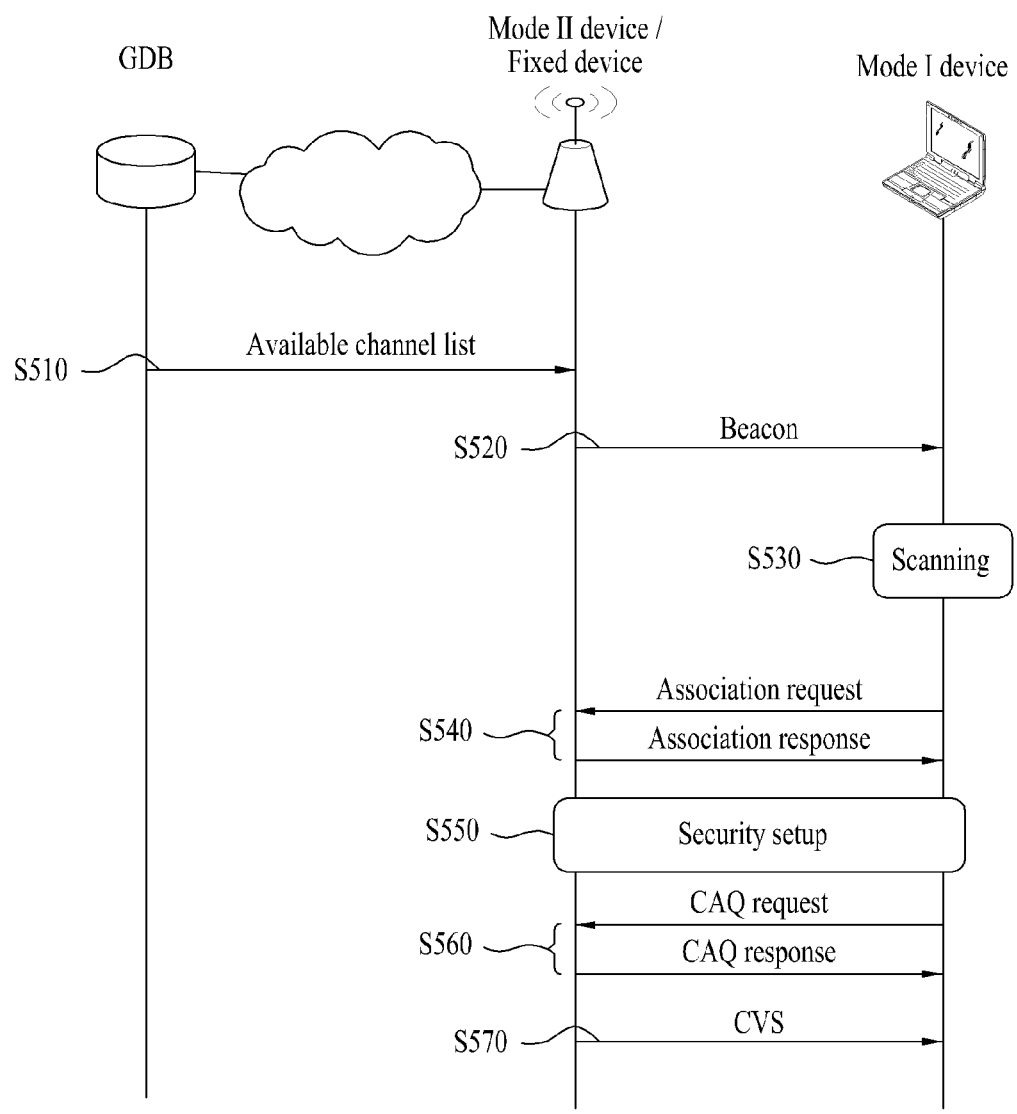

FIG. 6

| Element ID | Length | Map ID | Channel Map |
|---|---|---|---|

Octet      1      1      1      N (a)

| Element ID | Length | Country Code | Channel Map |
|---|---|---|---|

Octet      1      1      3      N (b)

FIG. 7

| Device Type | Channel Number N | Max. Transmission Power level on Channel N | Channel Number M | Device Transmission Power level on Channel M | ...... | Channel Number K | Max. Transmission Power level on Channel K | Validity time |
|---|---|---|---|---|---|---|---|---|

Octets:   1    1    1    1    1      1    1    8

(a)

| Device Type | Channel Number N | Max. Transmission Power level on Channel N | Validity time | ...... | Channel Number K | Max. Transmission Power level on Channel K | Validity time |
|---|---|---|---|---|---|---|---|

Octets:   1    1    1    8      1    1    8

| Device Type | Starting channel Number (S) | Number of Channels (L) | Channel Bitmap | Validity time |
|---|---|---|---|---|

Octets: 1  1  1  Variable  8

FIG. 9

These four fields are repeated according to the available channels

| Device Type | Start Frequency | Stop Frequency | Max. allowed transmission power | Validity time |
|---|---|---|---|---|

Octets: 1  1  1  Variable  8

(a)

These three fields are repeated according to the available channels

| Device Type | Start Frequency | Stop Frequency | Max. allowed transmission power | Validity time |
|---|---|---|---|---|

Octets: 1  1  1  Variable  8

These four fields are repeated according to the available channels

| Device Type | Center Frequency | Channel Bandwidth | Max. allowed transmission power | Validity time |
|---|---|---|---|---|

Octets :   1   1   1   Variable   8

(a)

These three fields are repeated according to the available channels

| Device Type | Center Frequency | Channel Bandwidth | Max. allowed transmission power | Validity time |
|---|---|---|---|---|

Octets :   1   1   1   Variable   8

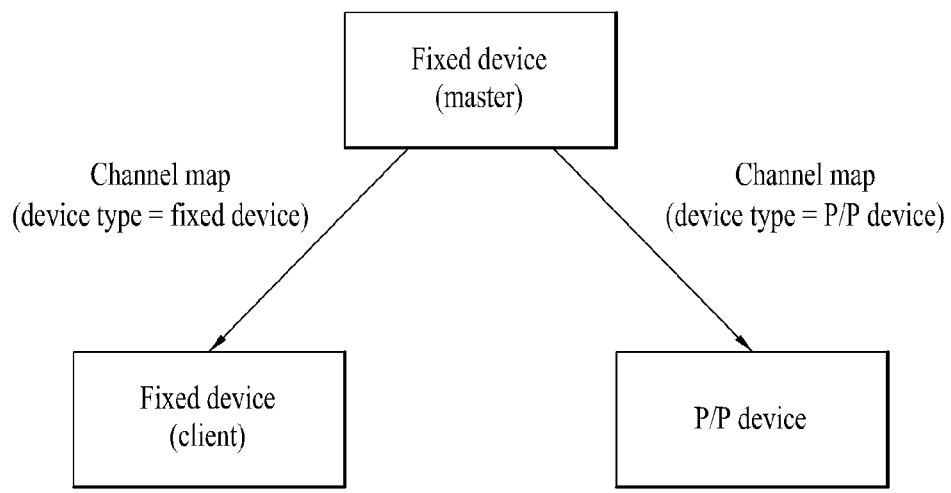

FIG. 12
(a) Vacant channels
(b) TV channel available for fixed device
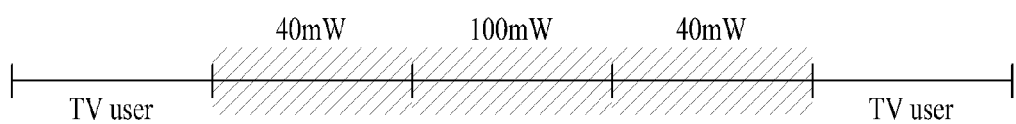
(c) TV channels available for P/P device
FIG. 13
| Category | Public action | Dialog token | Device class | FCC Identifier | Serial Number | Location |
|---|---|---|---|---|---|---|
| 1 | 1 | 1 | 1 | Variable | Variable | Variable |
Octet:
(a)
| Category | Public action | Dialog token | Status Code | WSM element |
|---|---|---|---|---|
| 1 | 1 | 1 | 1 | Variable |
Octet:
(b)

METHOD AND APPARATUS FOR DETERMINING OPERATING MODE OF DEVICE IN WIRELESS COMMUNICATION SYSTEM

TECHNICAL FIELD

The present invention relates to a wireless communication system, and more particularly, to a method of determining an operating mode of a device and apparatus therefor.

BACKGROUND ART

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

Meanwhile, a communication system for allowing an operation of an unlicensed user on a frequency band defined to be used by a licensed user is currently discussed. In this case, a frequency temporarily unused by the licensed user can be called a whitespace, and more particularly, a whitespace on a TV band can be called a TV whitespace (TVWS).

Currently, IEEE 802.11af standard is being developed to regulate an operation of an unlicensed device on TVWS (TV whitespace) band.

TVWS includes VHF (very high frequency) bands (e.g., 54~60 MHz, 76~88 MHz, 174~216 MHz) and UHF (ultra high frequency) band (e.g., 470~698 MHz) assigned for TV broadcasting, which mean the frequency bands allowed to be used for unlicensed devices under the condition that communications of licensed device (e.g., TV broadcasts, wireless microphones, etc.) operating on the corresponding frequency bands are not interrupted.

On 512~608 MHz or 614~698 MHz, operations are allowed for all unlicensed devices except several special cases. Yet, the bands 54~60 MHz, 76~88 MHz, 174~216 MHz and 470~512 MHz are allowed for the communications between fixed devices only. In this case, the fixed device means the device configured to perform a transmission at a determined location only. In the following description, a whitespace band includes the aforementioned TVWS, by which the present invention may be non-limited.

An unlicensed device desiring to use the whitespace band should provide a protection function for a licensed device. Hence, before a transmission is started on the whitespace band, it is mandatory to check whether a licensed device occupies the corresponding band. In particular, a use of an unlicensed device can be allowed only if a licensed device is not in use on a whitespace band.

To this end, an unlicensed device accesses a GDB (geo-location database) (or TV band database) through Internet or dedicated network and should obtain information on a channel list available for the corresponding area. In this case, the GDB is the database for storing and managing information on licensed devices registered therein and channel use information that dynamically changes depending on geo-locations and use times of the corresponding licensed devices. In order to solve the problem of co-existence between unlicensed devices that use the whitespace, such a signaling protocol as a common beacon frame and the like, a spectrum sensing mechanism and the like are available.

In IEEE 802.11 system, TVWS user equipment may indicate an unlicensed device that operates using IEEE 802.11 MAC (medium access control) layer and PHY (physical) layer. In the present specification, a station (STA) indicates a TVWS user equipment, which operates on TVWS spectrum, unless described separately.

The STA should provide a function of protecting an incumbent user or a primary user. In this case, the incumbent or primary user includes a licensed user (e.g., a TV user, a wireless microphone, etc.) and means a user to which a priority access is granted. In particular, in case that the incumbent user is using TVWS, the STA should stop using a corresponding channel. Hence, the STA discovers a channel (i.e., a channel not used by a licensed device) available for an unlicensed device and then should operate on the available channel.

A method for an STA to discover an available channel may include one of a scheme of performing a spectrum sensing mechanism, a scheme of discovering a TV channel schedule by accessing a GDB, and the like. For the spectrum sensing mechanism, it is able to utilize one of an energy detection scheme (i.e., if a strength of a received signal is equal to or greater than a predetermined value, determining that an incumbent user is using a corresponding channel), a feature detection scheme (i.e., if a digital TV preamble is detected, determining that an incumbent user is using a corresponding channel), and the like. Subsequently, the STA should check whether a corresponding channel is used by a licensed device at a corresponding location in a manner of accessing a GDB and then acquiring GDB information based on its location information. In doing so, the access to the GDB and the information acquisition should be performed frequently enough to protect the licensed device.

If it is determined that the incumbent user is using a channel right adjacent to a currently used channel through the spectrum sensing scheme or the GDB, a user equipment (or STA) and a base station (or an access point (AP)) can protect the incumbent user in a manner of lowering a transmission power.

DISCLOSURE OF THE INVENTION

Technical Tasks

A device operating on a whitespace band is required to operate based on available channel information valid for a corresponding timing point at its location. As mentioned in the foregoing description, the available channel information can be acquired from GDB. And, there exist a device of a type capable of directly accessing the GDB and a device of a type capable of indirectly acquiring the available channel information through the device of the type capable of directly accessing the GDB.

Although a device basically retains a function of directly accessing a GDB, it may happen that the corresponding device is unable to access the GDB or determine its location accurately. In this case, available channel information on the corresponding device may be inaccurate. Hence, an inaccurate available channel information may be provided to other devices. However, in a currently defined existing system, a solution for a problem caused by a case that a device having a GOD access capability is unable to access a GDB or determine a location accurately has not been provided yet.

One technical task of the present invention is to provide a method of determining an operating mode suitable for a device operating on a whitespace in consideration of GDB accessibility of the corresponding device or a state of the corresponding device for a geo-location determination.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of switching an operating mode of a station (STA) on a whitespace band according to one embodiment of the present invention includes the steps of initiating a timer related to an access to a database if the STA operates in a first operating mode, determining whether a message is received from the database while the timer is running, and if the message is not received from the database and the timer expires, switching the operating mode to a second operating mode.

To further achieve these and other advantages and in accordance with the purpose of the present invention, as embodied and broadly described, a station (STA) device for switching an operating mode of a station (STA) on a whitespace band according to another embodiment of the present invention includes a transceiver configured to perform transceiving with a different STA and a processor configured to control the STA device including the transceiver, the processor initiating a timer related to an access to a database if the STA operates in a first operating mode, the processor determining whether a message is received from the database while the timer is running, the processor, if the message is not received from the database and the timer expires, switching the operating mode to a second operating mode.

The following matters may be applicable in common to the above-mentioned embodiments of the present invention.

The timer may be initiated if the STA sends a message to the database.

The message sent to the database may include a channel availability query (CAQ) request frame.

The message received from the database may include a CAQ response frame.

The CAQ response frame may include a whitespace map (WSM).

If the message is received from the database, the timer may be re-initiated.

The method may further include the step of determining whether an accuracy of a geo-location of the STA is equal to or greater than a prescribed threshold.

If the accuracy of the geo-location is lower than the prescribed threshold, the operating mode may be switched to the second operating mode.

The determination of the accuracy of the geo-location may be performed by a prescribed period.

The prescribed period may be determined based on a mobility of the STA.

The first operating mode may be an operating mode for allowing to perform at least one of providing available channel information or providing an enablement signal to another STA.

The second operating mode may be an operating mode for allowing a signal transmission on the whitespace band by receiving available channel information from another STA or by a control from the another STA.

The step of switching to the second operating mode may include at least of deassociation for all STAs, stopping transmissions of a beacon frame, a probe response frame and an enablement response frame, or disconnecting Wi-Fi Direct connection.

The database may store available channel information on the whitespace band.

The above-mentioned general description of the present invention and the following details of the present invention are exemplary and may be provided for the additional description of the invention disclosed in claims.

Advantageous Effects

According to the present invention, a method of determining an operating mode suitable for a device operating on a whitespace in consideration of GDB accessibility of the corresponding device or a state of the corresponding device for a geo-location determination can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a flowchart to describe one example of a link setup process according to one embodiment of the present invention.

FIG. 6 is a diagram for one example of a WSM frame format.

FIGS. 7 to 10 are diagrams for examples of a channel map field format according to the present invention.

FIG. 11 is a diagram to describe a channel map providing method according to a device type.

FIG. 12 is a diagram to describe examples of a channel use according to a device type.

FIG. 13 is a diagram for one example of an enablement request frame format and an enablement response frame format.

BEST MODE FOR INVENTION

Figure 1:
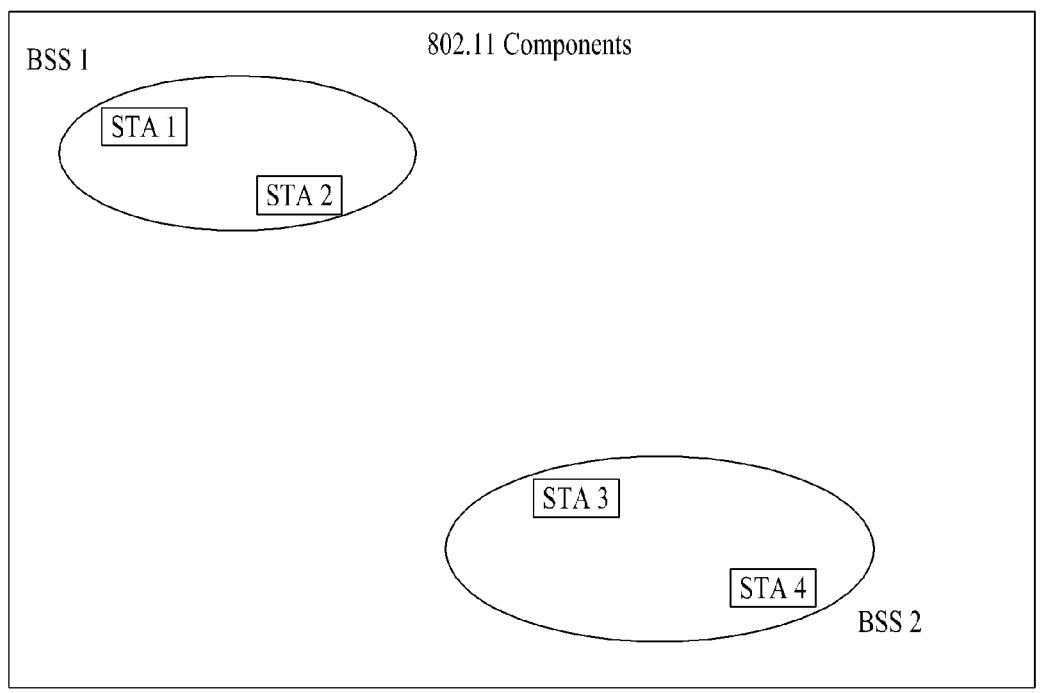
FIG. 1 is a diagram for one example of a structure of IEEE 802.11 system to which the present invention is applicable.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description mainly concerns IEEE 802.11 system, by which the technical idea of the present invention may be non-limited.

FIG. 1 is a diagram for one example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Figure 2:
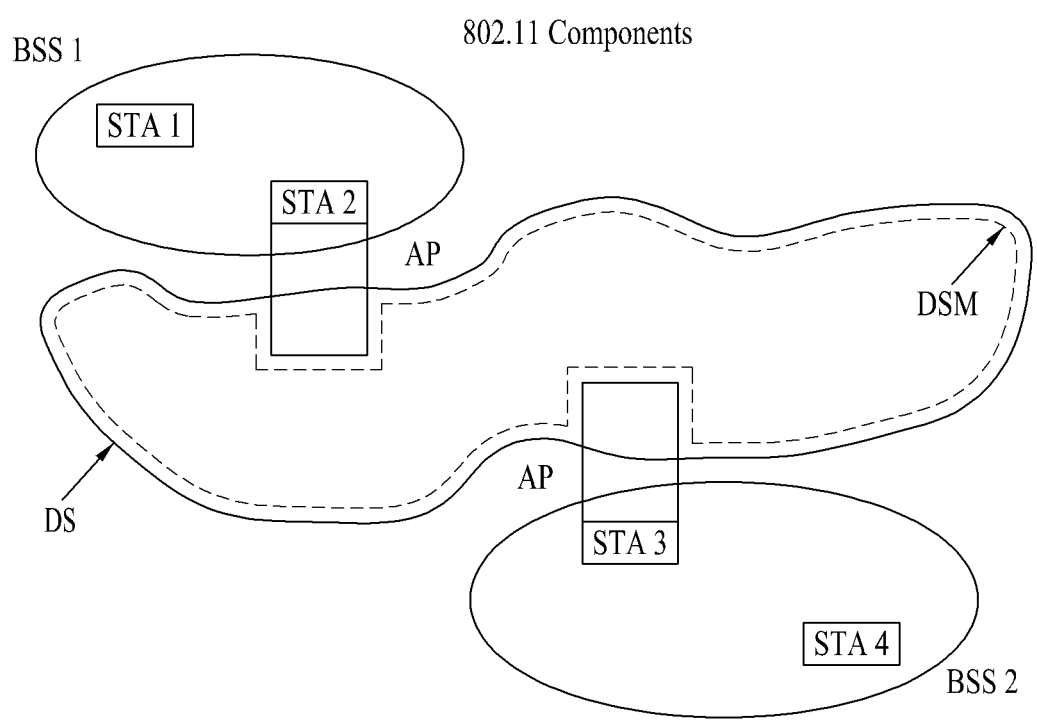
FIG. 2 is a diagram for another example of a structure of IEEE 802.11 system to which the present invention is applicable.

FIG. 2 is a diagram for another example of a structure of IEEE 802.11 system to which the present invention is applicable. In FIG. 2, components including a distribution system (DS), a distribution system medium (DSM), an access point (AP) and the like are added to the structure shown in FIG. 1.

A direct station-to-station distance in LAN may be limited by PHY performance. This distance limit may be enough for some cases. Yet, a station-to-station communication in farther distance may be necessary in some cases. In order to support an extended coverage, a distribution system (DS) may be configured.

The DS means a structure in which BSSs are mutually connected to each other. In particular, BSS may exist as a component of an extended type in a network including a plurality of BSSs instead of existing independently as shown in FIG. 1.

The DS corresponds to a logical concept and may be specified by a feature of a distribution system medium (DSM). Regarding this, IEEE 802.11 standard logically discriminates a wireless medium (WM) and a distribution system medium (DSM) from each other. Each of the logical media is used for a different purpose and is also used by a different component. According to the definitions in the IEEE 802.11 standard, the media are not limited to the same or the different. Thus, considering the fact that a plurality of media are logically different from each other, the flexibility of the IEEE 802.11 LAN structure (e.g., DS structure, other network structures, etc.) can be explained. In particular, the IEEE 802.11 LAN structure can be implemented into various examples. And, the corresponding LAN structure can be specified independently by a physical property of each of the implementation examples.

The DS can support a mobile device in a manner of providing seamless integration of a plurality of BSSs and logical services necessary for handling an address to a destination.

The AP means an entity that enables associated STAs to access a DS via WM and has STA functionality. Via the AP, data transfer between BSS and DS can be performed. For instance, STA 2 shown in FIG. 2 has functionality of STA and provides a function of enabling an associated STA (i.e., STA 1) to access a DS. For another instance, STA 3 shown in FIG. 2 has functionality of STA and provides a function of enabling an associated STA (i.e., STA 4) to access a DS. Since every AP basically corresponds to STA, it is an addressable entity. It may not be necessary for an address used by AP for communication on WM to be identical to an address used by AP for communication on DSM.

Data transmitted from one of STAs associated with an AP to an STA address of the AP is always received by an uncontrolled port and can be processed by IEEE 802.1X port access entity. Once a controlled port is authenticated, a transmitted data (or frame) can be forwarded to a DS.

Figure 3:
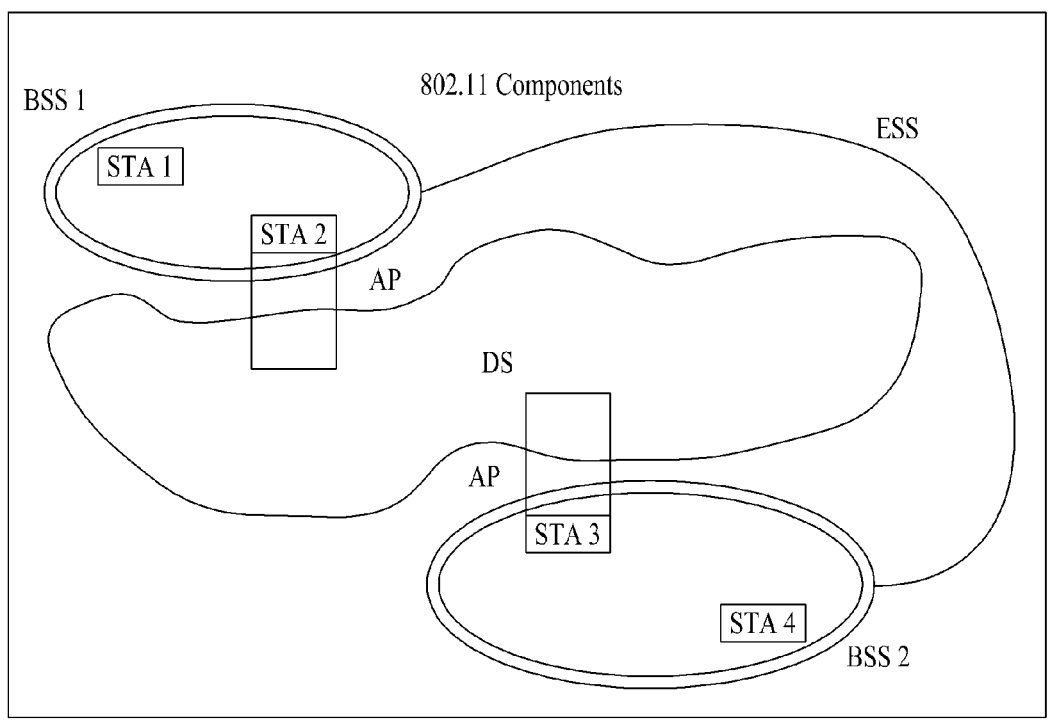
FIG. 3 is a diagram for a further example of a structure of IEEE 802.11 system to which the present invention is applicable.

FIG. 3 is a diagram for a further example of a structure of IEEE 802.11 system to which the present invention is applicable. FIG. 3 conceptionally shows an extended service set (ESS) to additionally provide a wide coverage to the structure shown in FIG. 2.

A wireless network having an arbitrary size and complexity can be configured with a DS and BSSs. In IEEE 802.11 system, such a network is called an ESS network. The ESS may correspond to a set of BSSs connected to a single DS. Yet, the ESS does not include the DS. The ESS network is characterized in looking like an IBSS network in LLC (logical link control) layer. STAs included in the ESS can communicate with each other and mobile STAs can move away from one BSS into another BSS (within the same ESS) in a manner of being transparent to LLC.

IEEE 802.11 assumes nothing about relatively physical locations of the BSSs shown in FIG. 3 and enables the following types. First of all, BSSs can overlap with each other in part, which is the type generally used to provide a continuous coverage. BSSs may not be connected to each other physically and no limitation is put on a distance between BSSs logically. BSSs can be physically situated at the same location, which can be used to provide redundancy. One IBSS (or at least one IBSS) or ESS networks can physically exist as one ESS network (or at least one ESS network) in the same space. This may correspond to an ESS network type in one of a case that an ad-hoc network operates at an ESS network exiting location, a case that IEEE 802.11 networks physically overlapping with each other are configured by different organizations, a case that at least two different access and security policies are necessary at the same location, and the like.

Figure 4:
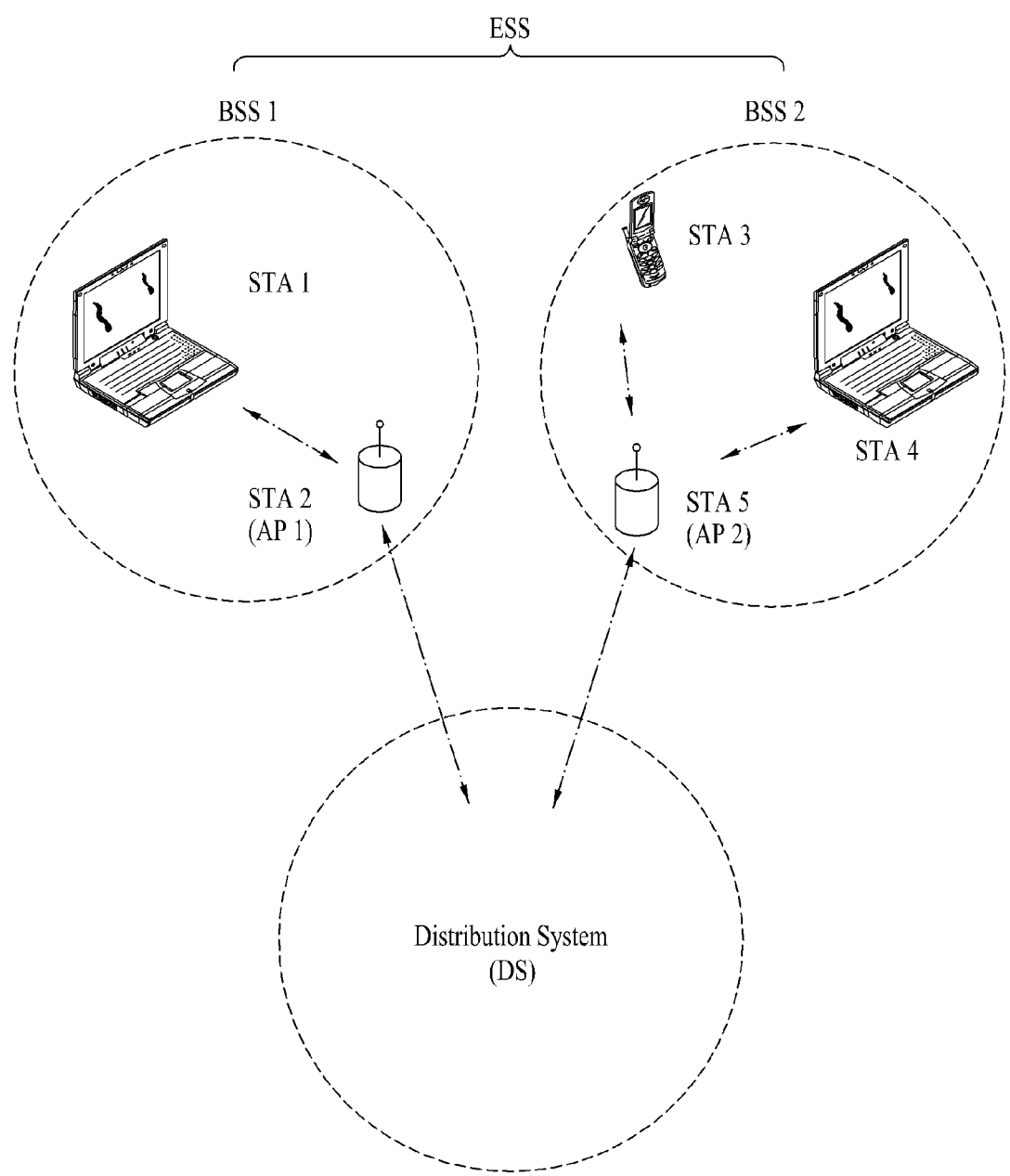
FIG. 4 is a diagram for one example of a structure of WLAN system.

FIG. 4 is a diagram for one example of a structure of WLAN system. In particular, FIG. 4 shows one example of BSS of a basic structure including a DS.

In the example shown in FIG. 4, BSS 1 and BSS 2 configure an ESS. In WLAN system, STA is a device that operates by MAC/PHY regulations of IEEE 802.11. The STA includes an AP STA and a non-AP STA. The non-AP STA generally corresponds to such a device directly handled by a user as a laptop, a mobile phone and the like. In the example shown in FIG. 4, STA 1, STA 3 and STA 4 correspond to non-AP STAs. And, STA 2 and STA 5 correspond to AP STAs.

In the following description, the non-AP STA can be called a terminal, a Wireless Transmit/Receive Unit (WTRU), a User Equipment (UE), a Mobile Station (MS), a Mobile Terminal, a Mobile Subscriber Station (MSS) or the like. And, the AP includes the concept corresponding to one of a Base Station (BS), a Node-B, an evolved Node-B (eNB), a Base Transceiver System (BTS), a Femto BS and the like in other wireless communication fields.

Available Channel on Whitespace

In order for an STA to operate on a whitespace, a protective scheme for a licensed device (or an incumbent user) should be preferentially provided. Hence, the STA should discover an available channel, which can be used by an unlicensed device because of not being used by a licensed device, and operate on the discovered available channel. If the channel currently used by the STA does not correspond to the available channel anymore, the STA stops using the channel.

In order for an STA to obtain channel availability (e.g., TV channel availability) on a whitespace (e.g., TVWS), the STA can discover a TV channel schedule by performing a spectrum sensing or accessing a GDB. GDB information may include4 information such as a use schedule (i.e., a channel use time) of a specific channel of a licensed device at a specific location and the like. An STA intending to obtain availability of a TV channel should bring a GDB information based on its location information by accessing a GDB through Internet and the like, which should be performed by a time unit enough to protect a licensed device.

In the present document, for clarity of the description, information on an available channel and frequency, which is received from a GDB, can be named a white space map (WSM). The WSM is generated from configuring information on a channel available for an unlicensed device on a TVWS band into a map based on a channel and frequency information acquired by an STA from a GDB. The WSM can include information on an available channel list or frequencies available for an unlicensed device. Channels included in the available channel list are channels unused by signals (or users) that should be legally protected. And, the channels included in the available channel list are available for an unlicensed device at the timing point at which the unlicensed device accesses a GDB. In case that an unlicensed device makes a request for an available channel after expiration of a specific time from a timing point at which the unlicensed device accessed a GDP, the WSM can include information on an available channel and frequency since the corresponding timing point. For another example, in case that an unlicensed device makes a request for an available channel to a GDB, it is able to deliver information on an available channel and frequency in a manner of signaling a channel unavailable for the unlicensed device.

The current regulation for TVWS of FCC (Federal Communications Commission) mainly defines two kinds of device types. In particular, a personal/portable device of a small-scale output and a fixed device of a large-scale output are defined. In this case, the personal/portable device can be personally carried and the fixed device can operate at a fixed location. The fixed device can be named a fixed STA, while the personal/portable device can be named a P/P STA. Each of the fixed STA and the P/P SA can correspond to a general STA in WLAN system (i.e., the terminology 'STA' includes an AP and a non-AP). When each of the two kinds of the devices operates on TVWS, a different operation rule may apply thereto. The fixed device transmits/receives a signal at a specific location of which location is non-changeable. Of course, in order for the fixed device to transmit a signal at the corresponding location, the fixed device should acquire available channel information by accessing a GDB. Such a location checking equipment as a GPS (global positioning system) and the like may be installed in the fixed device. Yet, a location of the fixed device is directly inputted by a person through an installer, whereby the location information can be delivered to the GDB. Of course, when a person directly inputs a location, if the location is inputted after one installation, the inputted location is assumed as unchangeable. If a location is changed, a corresponding location should be changed/registered. A fixed device can service another fixed device of the same kind. And, the fixed device can service a {/P device as well. When a fixed device downloads available channel information from a GDB, the fixed device should download its available channel information directly available for itself by delivering its device type. Simultaneously, in order to service a P/P device, the fixed device should additionally download available channel information available for the P/P device from the GDB or a proxy server connected to the GDB. Since the fixed device and the P/P device differ from each other in available channel interval and requirements for maximum allowed transmission power and adjacent channel on operation, an available channel list changes per device type. For instance, signal transmissions are allowed for the fixed device on frequency intervals of 512~608 MHz and 614~698 MHz as well as on frequency intervals of 54~60 MHz, 76~88 MHz, 174~216 MHz and 470~512 MHz. yet, signal transmissions are not allowed for the P/P device on TVWS band of frequency band other than frequency intervals of 512~608 MHz and 614~698 MHz. The fixed device can transmit a signal with a power higher than that of the P/P device. And, a transmission power of maximum 4 Watts is allowed as an effective isotropic radiated power (EIPR) for the fixed device.

The P/P device is an equipment capable of transmitting/receiving a signal at an unspecified location and is characterized in that the corresponding location is changeable. In most cases, the P/P device is the equipment that can be carried by a person and its mobility is not predictable. An available frequency band of the P/P device includes frequency intervals of 512~608 MHz and 614~698 MHz and a maximum transmission power of the P/P device amounts to 100 mW (EIRP). In particular, compared to the transmission power allowable for the fixed device, the transmission power allowable for the P/P device is limited.

The P/P device can be categorized into two kinds of types, i.e., Mode II device and Mode I device, depending on identification capability for its location, and more particularly, on geo-location capability and GDB accessibility or GDB access capability through an internet access. In particular, the Mode II device retains the geo-location decision capability and the internet access capability. The Mode II device acquires an information on an available channel at its location by accessing a GDB and is then able to operate on TVWS at the corresponding location. On the other hand, the Mode II device acquires available channel information from a GDB and is then able to start a network by transmitting a signal (e.g., an enable signal, etc.) for commanding a communication start to the Mode I device. Meanwhile, the Mode I device does not require the geo-location decision capability or the GDB access capability but is required to operate by accessing a GDB under the control of the Mode II device or the fixed device retaining a valid available channel information. The Mode I device can acquire the available channel information from the Mode II device or the fixed device and should check the validity of an available channel periodically. For the Mode I device, an operation on an available channel can be allowed after confirmation of an identifier (e.g., a device ID) of the corresponding device. In this case, the Mode II device or the fixed device may correspond to an enabling STA and the Mode I device may correspond to a dependent STA. An enabling signal transmitted to the dependent STA by the enabling STA may correspond to a beacon frame.

A P/P device corresponding to a Mode II device can serve other P/P devices. And, a P/P device corresponding to a Mode II device may service a fixed device. In this case, the Mode II P/P device acquires available channel information for the fixed device from a GDB and is then able to forward it to the fixed device.

For clarity of the following description, embodiments of the present invention are explained by taking TVWS as an example of a white space, by which the scope of the present invention may be non-limited. In particular, the scope of the present invention includes embodiments of the present invention applied to all operations on a white space controlled by a DB that provides information on an available channel at a specific location. For instance, an operation of an unlicensed device controlled by a GDB is expected to be allowed on a frequency band expected to correspond to a white space later despite failing to correspond to the white space at a current timing point. And, examples, which are applied to this, according to the principle of the present invention can be included in the scope of the present invention. Moreover, for clarity of the description of the present invention, the principle of the present invention is described based on FCC rules for TVWS, of which final rule has been currently announced. Yet, the scope of the present invention is not limited to an operation on a white space band according to the FCC rules but includes examples according to the principle of the present invention on the white space band abiding by other rules.

Acquisition of Available Channel Information for Mode I Device

In the following description, a process for a Mode I device, which operates on a white space band, to acquire available channel information from a Mode II device or a fixed device is explained.

FIG. 5 is a flowchart to describe one example of a link setup process according to one embodiment of the present invention.

In a step S510, a Mode II device or a fixed device (hereinafter represented as 'Mode II device/fixed device') accesses a GDB via Internet or the like and is then able to acquire an available channel list (e.g., WSM) at its current location.

In a step S520, the Mode II device/fixed device can configure a BSS by transmitting a beacon. In this case, information on the available channel list and the like can be included in a beacon frame. And, the beacon frame can be transmitted by periods.

In a step S530, a Mode I device intending to join the BSS can perform a TVWS scanning process. In case that the Mode I device is aware of an available channel list at its current location, the Mode I device can perform a passive or active scanning on channels on the available channel list only. In this case, the passive scanning means a process for the Mode I device to listen to a beacon transmission on a scanning channel from the Mode II device/fixed device. And, the active scanning means a process as follows. First of all, the Mode I device transmits a probe request frame on the scanning channel. Secondly, the Mode I device receives a probe response frame from the Mode II device/fixed device.

In doing so, in order to join the BSS, the Mode I device should operate under the control of the Mode II device/fixed device. Hence, the Mode I device should perform a link setup with the Mode II device/fixed device.

In a step S540, after the scanning process has been completed, the Mode I device is able to perform an association process to join the BSS. To this end, the Mode I device can transmit an association request frame to the Mode II device/fixed device.

In a step S550, after the successful completion of the association request and response process, a security setup process is performed. In doing so, the security setup may include a process for performing a private key setup by 4-way handshaking through EAPOL (extensible authentication protocol over LAN) frame. And, the security setup should be performed between the Mode II device/fixed device and the Mode I device. The reason for this is that an integrity check and the like are required for the Mode II device/fixed device to deliver the WSM to the Mode I device.

In a step S560, after the completion of the security setup, the Mode I device is able to make a request for a list (e.g., WSM) of available channels by transmitting a channel availability request frame (or a channel availability query (CAQ) request frame) to the Mode II device/fixed device. Subsequently, the Mode II device/fixed device can provide the available channel list (e.g., WSM) by transmitting a channel availability response frame (or a CAQ response frame) to the Mode I device. The Mode I device is then able to complete the link setup process with the Mode II device/fixed device by receiving the available channel list (e.g., WSM). Once the link setup is completed, the Mode I device is able to initiate the mutual transceiving for data, control, management frame and the like with the Mode II device/fixed device.

In a step S570, after the link setup, the Mode I device is able to periodically receive CVS (contact verification signal) from the Mode II device/fixed device. In particular, in order to operate on the whitespace band, the Mode I device (or a dependent STA) should be controlled by the Mode II device/fixed device (or an enabling STA). If the Mode I device does not retain a GDB access capability, it is able to use the CVS periodically transmitted by the Mode II device/fixed device in order to check the validity for an available channel/frequency. The CVS can have a function of maintaining a link setup status effective. The CVS can include a map ID of the WSM retained by the Mode II device/fixed device. Hence, the Mode I device can periodically check what is a currently valid channel. If the WSM is not indicated by the map ID of the CVS, the Mode I device is able to determine that the corresponding WSM is not valid. In particular, when the Mode I device receives a CVS frame, the Mode I device compares it to the map ID of the WSM retained by the Mode I device. If they are different, the Mode I device is able to make a request for a new available channel list (e.g., WSM) by transmitting a CAQ request frame to the Mode II device/fixed device.

WSM (WhiteSpace Map)

FIG. 6 (*a*) is a diagram for one example of a WSM frame format.

In FIG. 6 (*a*), an element ID field can have a prescribed value indicating a WSM information element.

In FIG. 6 (*a*), a length field can have a value corresponding to a length of following fields. Since an available channel on a whitespace band is variable, a length of a channel map field mentioned in the following may vary depending on a variation of the number of the available channels. Hence, the value of the length field can have a different value depending on a variation of a size of the channel map field.

In FIG. 6 (*a*), an information indicating whether a channel map is updated and an information indicating whether a channel set transmitted on the channel map corresponds to an available channel list entirely or partially can be included in a map identifier (map ID) field.

In FIG. 6 (*a*), a channel map field can include a list (or a channel number) of available channels, a maximum allowed transmission power (or a transmission power restriction value) on a corresponding channel, and the like.

A channel number in a channel map can be configured with reference to a TV channel number, which is not mandatory. Alternatively, it is able to use a channel number of a unit provided by a database of a regulatory domain (e.g., according to regulations of each country). In particular, if a smallest basic unit for configuring an available channel list provided by a database of a TVWS band corresponds to a bandwidth of a TV channel, a basic unit of the channel map can become a TV channel bandwidth. For instance, a TV channel bandwidth of U.S.A. or Republic of Korea is 6 MHZ. And, a TV channel bandwidth of Europe is defined as 8 MHz. For another instance, a TV channel bandwidth is defined as 7 MHz in some countries.

FIG. 6 (*b*) is a diagram for another example of a WSM frame format.

In FIG. 6 (*b*), since an element ID field, a length field and a channel map field are identical to those shown in FIG. 6 (*a*), redundant descriptions shall be omitted from the following description.

In FIG. 6 (*b*), a country code field provides information on interpretation of a channel map field. In particular, each country may differ in a TV band range and a TV channel bandwidth. And, a corresponding regulatory domain can be defined in various ways. Hence, the country code field is interpreted together with the channel map field so that a physical location of a TV channel available for a WSM receiving STA can be determined. A country string value of 3-octet length can be signaled through the country code field. In the country string, first 2 octets indicate a country code defined in ISO/IEC (international organization for standardization/international electrotechnical commission) 3166-1. In the country string, last 1 octet means an environment and is able to include an information (e.g., an area code value in a specific country) further detailed than a country information.

FIG. 7 is a diagram for one example of a channel map field format according to the present invention.

In the examples shown in FIG. 7 (*a*) and FIG. 7 (*b*), a device type field can indicate whether a device related to a channel map is an AP, an STA (not AP), a fixed device, a P/P device, or the like.

In the examples shown in FIG. 7 (*a*) and FIG. 7 (*b*), a channel number field indicates a channel number (e.g., a TV channel number) corresponding to an available channel and a field 'maximum transmission power level on channel X' indicates a limited value of a maximum transmission power allowed for the channel X.

In the examples shown in FIG. 7 (*a*) and FIG. 7 (*b*), a validity time field indicates a period for using an available channel continuously.

FIG. 7 (*a*) shows one example as follows. First of all, a tuple consisting of 2 fields 'channel number' and 'maximum transmission power level' is repeated. Secondly, a validity time field is included last. In case shown in FIG. 7 (*a*), a validity time applying to all channels included in a channel list can be set in common.

FIG. 7 (*b*) shows one example that a tuple consisting of 3 fields 'channel number', 'maximum transmission power' and 'validity time' is repeated. In case shown in FIG. 7 (*b*), a validity time applying to each channel can be set individually.

FIG. 8 is a diagram for another example of a channel map field format according to the present invention.

Referring to FIG. 8, a starting channel number field can include a number of a channel corresponding to a starting position of an available channel. A field 'number of channel' can indicate how many channels are included by starting with the starting position. A channel bitmap field includes a bitmap of a length determined by the starting position and the number of channels and indicates an available channel as a bitmap. And, as mentioned in the foregoing description with reference to FIG. 7 (*a*), a validity time field can indicate a validity time applying to available channels in common.

A specific value in the bitmap indicates that a corresponding channel number corresponds to an available channel, and another value can indicate an unavailable channel. In this case, since an available channel list may vary depending on a device type, a length of a whole available channel list, a maximum allowed transmission power value per channel and the like can be determined for each device type.

For instance, TV channels for which transmissions between AP and STA of TVWS 802.11 are allowed correspond to TV channels #21 to #51 defined with a bandwidth of 6 MHz in America (US). In this case, it is able to indicate a presence or non-presence of an incumbent user (or a primary user) for 30 TV channels. For instance, a bitmap can be represented as 0 (i.e., unavailable) in case of a presence of an incumbent user or as 1 (i.e., available) in case of a presence of an incumbent user, in ascending order from a low TV channel number (or in descending order from a high TV channel number). Alternatively, a mapping relation between a bit value and a presence of non-presence of channel availability can be configured in reverse.

The example of the channel map using the bitmap shown in FIG. 8 is applicable to a case of reducing overhead smaller than that of the channel map configuration attributed to the tuple repetition shown in FIG. 7.

FIG. 9 is a diagram for another example of a channel map field format according to the present invention.

The example shown in FIG. 9 represents a method of indicating an information on an available channel in database not by TV channel unit but by frequency unit. In particular, the available channel information directly indicates a vacant frequency (i.e., a frequency available for an unlicensed device) actually unused by a licensed user.

In the examples shown in FIG. 9 (*a*) and FIG. 9 (*b*), a start frequency field indicates a start position of an available frequency interval and a stop frequency field indicates an available frequency interval stop position. And, a maximum allowed transmission power field indicates a maximum transmission power limit value allowed in a corresponding frequency interval.

According to frequency use properties of licensed users, it is highly possible that an available frequency band for unlicensed devices may exist non-contiguously rather than contiguously. Hence, since it is difficult for a single frequency interval to indicate available channel information, a tuple including a start frequency field, a stop frequency field and a maximum allowed power field can be repeated in order to indicate a plurality of frequency intervals.

In the example shown in FIG. 9 (*a*), in case that there are a plurality of available frequency intervals, a tuple consisting of 4 fields 'start frequency', 'stop frequency', 'maximum allowed transmission power' and 'validity time' is repeated. In this case, a validity time for each of the frequency intervals can be set up individually.

In the example shown in FIG. 9 (*b*), in case that there are a plurality of available frequency intervals, a tuple consisting of 3 fields 'start frequency', 'stop frequency' and 'maximum allowed transmission power' is repeated. In this case, a validity time applying to all of the frequency intervals can be set up in common.

FIG. 10 is a diagram for further example of a channel map field format according to the present invention.

Like the example shown in FIG. 9, the example shown in FIG. 10 corresponds to a method of representing available channel information not as a TV channel number but as a frequency band.

In the examples shown in FIG. 10 (*a*) and FIG. 10 (*b*), a center frequency field indicates a center frequency position of an available frequency interval. A channel bandwidth field indicates a size of a bandwidth with reference to a center frequency. A single frequency interval can be specified by the center frequency and the channel bandwidth. For instance, if a frequency of 10 MHz toward a low frequency and a frequency of 10 MHz band toward a high frequency with reference to 690 MHz are available, a signaling for this can be configured with 'center frequency=690 MHz, Channel Bandwidth=20 MHz'. A maximum allowed transmission power field indicates a maximum transmission power limit value allowed for a corresponding frequency interval.

In the example shown in FIG. 10 (*a*), in case that there are a plurality of available frequency intervals, a tuple consisting of 4 fields 'center frequency', 'channel bandwidth', 'maximum allowed transmission power' and 'validity time' is repeated. In this case, a validity time for each of the frequency intervals can be set up individually.

In the example shown in FIG. 10 (*b*), in case that there are a plurality of available frequency intervals, a tuple consisting of 3 fields 'center frequency', 'channel bandwidth' and 'maximum allowed transmission power' is repeated. In this case, a validity time applying to all of the frequency intervals can be set up in common.

In the above-described examples of the channel map field structure shown in FIGS. 7 to 10, an information indicated by a channel map can vary depending on a value of a device type field. As mentioned in the foregoing description, the device type field can indicate whether a corresponding channel map relates to a TV channel region assigned to a P/P device or a TV channel region assigned to a fixed device. For instance, when a channel map is given as a bitmap shown in FIG. 8, if a value of a device type is indicated as 'type=0', the channel bitmap can correspond to a bitmap (i.e., bit 1 to bit 30) for 30 channels including TV channel #21 to TV channel #51. If a value of a device type is indicated as 'type=1', it may correspond to a case that a channel map receiving STA is a fixed device or a case of intending to indicate an available channel on a bandwidth assigned for a communication between fixed devices. Since this case corresponds to a case that a channel map indicates a presence or non-presence of availability of channels and frequencies on 54~60 MHz (1 TV channel on 6-MHz band), 76~88 MHz (2 TV channels on 6-MHz band), 174~216 MHz (7 TV channels on 6-MHz band), and 470~512 MHz (7 TV channels on 6-MHz band), a channel bitmap can be configured with bit 1 to bit 17 in case of 'type=1'.

FIG. 11 is a diagram to describe a channel map providing method according to a device type.

In case of a fixed device, a device capable of providing WSM to another fixed device can be called a fixed device in master mode. And, a device operating on whitespace by being provided with WSM from another fixed device can be called a fixed device in client mode. As mentioned in the foregoing description, since information on a channel map can be configured different depending on a device type, each of a WSM receiving fixed device and a WSM receiving P/P device needs to check which channel map is a channel map for the corresponding device. To this end, when a fixed device in master mode transmits a channel map to another device, it is able to indicate whether the corresponding channel map is for another fixed device (i.e., a fixed device in client mode) or for a P/P device.

FIG. 12 is a diagram to describe examples of a channel use according to a device type.

Referring to FIG. 12 (*a*), it is able to assume a case that TV channel 21 and TV channel 25 are occupied by an incumbent user (e.g., a TV user) among TV channels 21 to 25. In this case, TV channels 22 to 24 correspond to vacant TV channels.

Referring to FIG. 12 (b), a fixed device is unable to use a channel right adjacent to a channel occupied by an incumbent user. The reason for this is as follows. Since a maximum transmission power of the fixed device is 4 Watts, it may cause interference to the adjacent channel. Hence, the fixed device can operate with a maximum power of 4 Watts on the channel #23 except the adjacent channels #22 and #24 adjacent to the channels #21 and #25 occupied by the incumbent user.

Referring to FIG. 12 (c), a P/P device is allowed to operate on an adjacent channel of a channel occupied by an incumbent user. Hence, the P/P device can operate on the adjacent channels #22 and #24 of the channels #211 and #25 occupied by the incumbent user with a low maximum transmission power of 40 mW. And, the P/P device can operate on the channel #23 with a maximum transmission power of 100 mW.

Method of Determining Operating Mode of Device

As mentioned in the foregoing description, an available channel on a whitespace band is determined differently depending on a device type. In particular, a GDB calculates available channel information at a location requested by an unlicensed device in consideration of a channel use schedule and protection contour of such an incumbent user on a whitespace band as a DTV, a microphone and the like and is then able to deliver the calculated available channel information to the unlicensed device. Parameters considered by the GDB in calculating the available channel information include a device type, an operation desired location, a transmission power, a spectrum mask and the like. Moreover, in FCC regulations, a presence or non-presence of a use of an adjacent channel varies depending on a device type. For instance, while a DTV currently uses a channel #30, although channels #29 and #31 are vacant, a fixed device is unable to use the channels #29 and #31 but a P/P device is able to use the channels #29 and #31. The reason for this is that it is highly probable that a high transmission power of the fixed device may cause interference to the adjacent channel.

Thus, when unlicensed devices operate on a whitespace band, there may exist a fixed device operating with a relatively high power and a P/P device operating with a relatively low power. As mentioned in the foregoing description, a fixed device may be defined to operate on a specific frequency band (e.g., 54~60 MHz, 76~88 MHz, 174~216 MHz, 470~512 MHz, etc.) only. On the other hand, since considerable interference may be caused to a signal of a nearby P/P device on a frequency band available for both of a fixed device and a P/P device without discrimination due to an operation of a fixed device with a high power, it is necessary for an available channel to be assigned in consideration of types of devices and/or locations of the devices in order for devices of different types to coexist.

To this end, a device accessible to a GDB is required to have capability of confirming its location in accordance with an accuracy level required by a regulation. In particular, a device playing a role in acquiring an available channel from a GDB and then informing another device of available channel information should have capability of accessing the GDB and should be able to provide a location information to the GDB (or a proxy server connected to the GDB). Thus, if any one of a GDB access capability and a location determining capability of a prescribed device is not performed correctly, the corresponding device fails in acquiring available channel information or acquires an inaccurate available channel information.

According to the present invention, device types can be categorized into a fixed device and a P/P device. And, the P/P device can be subdivided into a Mode II device and a Mode I device. A fixed device is able to server another fixed device or a P/P device. And, a Mode II device of a P/P device can service a Mode I device or a fixed device. As mentioned in the foregoing description, since available channel information can be defined differently depending on a device type, a fixed device or a P/P device can acquire available channel information for the fixed device and available channel information for the P/P device from a GDB. And, a fixed device or a Mode II device should provide an accurate location to a GDB in order to acquire an appropriate available channel information at the corresponding location. Hence, the fixed device or the Mode II device is required to retain a GDB access capability (GDB accessibility) and a geo-location decision capability (geo-location capability).

According to the present invention, a device type can be categorized into an enabling STA or a dependent STA. As mentioned in the foregoing description, in order to operate on a whitespace band, the dependent STA should undergo an enablement procedure. The enabling STA means an STA retaining a capability of enabling another dependent STA. The enabling STA is able to transmit a signal without receiving an enabling signal and is also able to initiate a network. On the contrary, the dependent STA can transmit a signal on a whitespace band only if receiving an enabling signal. IN particular, the dependent STA can operate under the control of the enabling STA.

The enablement procedure is described schematically as follows. First of all, if a dependent STA receives an enabling signal, the dependent STA can transmit an enablement request frame to an enabling STA having transmitted the corresponding enabling signal. In response to the enablement request frame, the enabling STA can transmit an enablement response frame. And, the enabling signal may correspond to a beacon frame or a probe response frame. In particular, a specific information element may be included in the beacon frame or the probe response frame or a specific bit may be set in the beacon frame or the probe response frame.

FIG. 13 (a) is a diagram for one example of an enablement request frame format.

First of all, a category field plays a role in indicating a category (e.g., a spectrum management, a QoS (quality of service), etc.) to which a corresponding frame pertains. In the present example, the category field can be set to a value indicating a public action frame.

A public action field plays a role in indicating that a corresponding frame is related to which action. In the present example, the public action field can be set to a specific value for an enablement request frame.

A dialog token field plays a role in matching an action response and an action request and can be used for a case that several action requests exist at the same time. And, the dialog token field can include a value set by a requesting STA.

A device class field is used to indicate a characteristic of an STA that requests an enablement. For instance, the device class field can be set to a value indicating one of a non-AP STA, an AP and a fixed STA.

An FCC identifier field and a serial number field are the fields corresponding to an identification information of a device. And, an FCC ID of a device and a serial number of a manufacturer can be included in the corresponding fields, respectively. If the FCC ID is enough for an information for identifying a device, the serial number can be omitted if necessary.

A location field can be included as a value indicating a location of an STA that requests an enablement. For instance, values for latitude, longitude and altitude can be included. And, the location field can be optionally included in an enablement request frame.

FIG. 13 (b) is a diagram for one example of an enablement response frame format.

First of all, a category field can be set to a value indicating a public action frame. And, a public action field can be set to a specific value indicating an enablement response frame.

A dialog token field can have a value equal to a value set in a dialog token field of an enablement request frame. If the enablement response frame is not transmitted in response to the enablement request frame, the dialog token field can be set to a specific value (e.g., 0).

A status code field indicates whether an enablement is declined and can be set to a value indicating a reason for the declination (e.g., declined by a restriction of a GDM, etc.).

A WSM element field can include the former WSM information element described in the description of the example with reference to FIG. 6.

In particular, a dependent STA transmits an enablement request frame containing its information (e.g., a device class, an identification information, a location information, etc.) to an enabling STA. Having received the enablement request frame, the enabling STA verifies whether the identification information of a requestor (i.e., the dependent STA) is valid by accessing a DB and is then able to transmit an enablement response frame to the dependent STA. Having received the enablement response frame, the dependent STA is able to operate on a whitespace band based on a WSM information (i.e., available channel information) included in the enabling response frame. Moreover, the enabling STA updates the WSM information (i.e., the available channel information) through CAQ request/response exchange with the GDB and is then able to provide the available channel information to the dependent STA based on the updated available channel information (through CAQ request/response frame exchange between the enabling STA and the dependent STA, etc.).

In order to operate as an enabling STA on a white space band and to provide an enablement to a dependent STA, an enabling STA should retain a GDB access capability and a geo-location capability for determining its geo-location. In this case, although a device is authenticated as a Mode II device, the corresponding device is unable to access a GDB temporarily or may not determine its location correctly. For instance, the corresponding device is unable to access Internet, a GPS function of the corresponding device fails, or the corresponding device is unable to recognize its location information. In this case, even if the corresponding device corresponds to a fixed device or a Mode II device, it is difficult to guarantee that an available channel acquired by the corresponding device is correct. Hence, the corresponding device should not control a Mode I device (particularly, the mode I device provides the available channel). The corresponding device should not operate as the fixed device or the Mode II device. And, the corresponding device should operate like the Mode I device under the control of a device having a different valid available channel information.

Therefore, although a prescribed device retains a GDB access capability or a geo-location decision capability to operate as an enabling STA (e.g., a fixed device, a Mode II device, etc.), if at least one of the GDB access capability and the geo-location decision capability is not enabled, the prescribed device should operate as a dependent STA.

If such a device type as a fixed device, a Mode II device and a Mode I device, which are mentioned in the above description, is matched to an enabling STA and a dependent STA, it can be summarized as follows. First of all, a fixed device serving another fixed device or a P/P device can correspond to an enabling STA. A Mode II device serving a Mode I device or a fixed device can correspond to an enabling STA. A fixed device served by a fixed device or a Mode II device can correspond to a dependent STA. A Mode I device served by a fixed device or a Mode II device can correspond to a dependent STA. In the following description, based on the above matching relation, one embodiment of the present invention is described using such a terminology as an enabling STA and a dependent STA.

Figure 14:
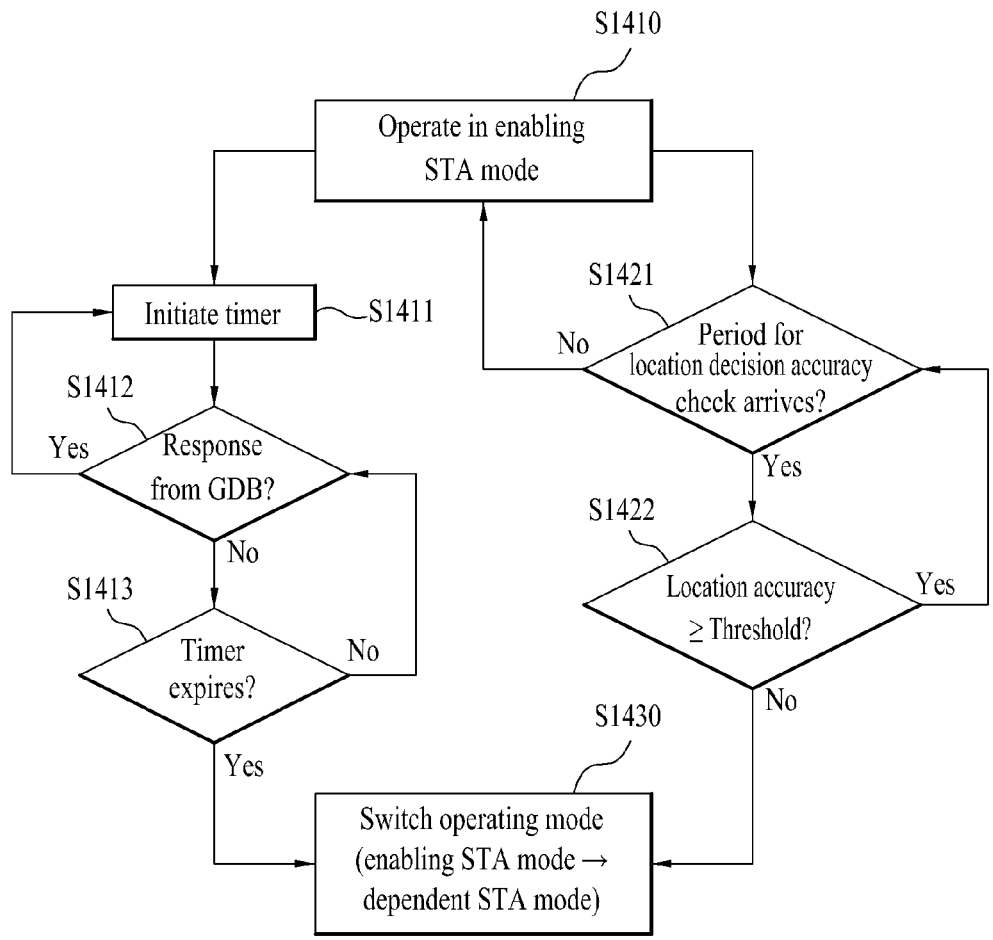
FIG. 14 is a flowchart of a method of operating mode determining method according to one embodiment of the present invention.

FIG. 14 is a flowchart of a method of operating mode determining method of a device in consideration of a state of a GDB accessibility or a geo-location decision according to one embodiment of the present invention.

FIG. 14 shows a process of switching an operating mode of a prescribed STA currently operating in an enabling STA mode [S1410]. In particular, FIG. 14 shows an operating mode switching procedure [S1411 to S1413] based on a GDB accessibility and an operating mode switching procedure [S1421, S1422] based on an accuracy of a geo-location decision. In particular, the operating mode switching of the step S1430 can be performed by at least one of the steps S1411 to S1413 and the steps S1421 and S1422. So to speak, an operating mode switching of a prescribed device can be performed in one of a case that a GDB accessibility of the corresponding device is disabled, a case that accuracy of a geo-location decision decreases to become lower than a predetermined level (including disablement of a location decision capability), and a case that the GDB accessibility is disabled and that accuracy of a geo-location decision decreases to become lower than a predetermined level.

Referring to FIG. 14, in a step S1410, an STA may currently operate in an enabling STA mode. In a step S1411, the STA can initiate a timer related to GDB accessibility. The timer can operate to expire after a predetermined time. The timer can be initiated at a timing point (i.e., a timing point of sending a message to the GDB) at which the STA accesses a GDB. For instance, the timer can be initiated at a timing point at which the STA transmits a CAQ request frame to the GDB. And, the timer can be initiated at a timing point of sending a message to the GDB in order to verify an ID of a dependent STA received from the corresponding dependent STA intending to join a network.

In a step S1412, the STA can determine whether a message is received from the GDB. As a result of the determination, if a response message is received from the GDB, the STA can re-initiate the timer by going back to the step S1411. As a result of the determination, if the response message is not received from the GDB, the STA can go to a step S1413.

In the step S1413, the STA can determine whether the timer expires. If the timer does not expire, the STA goes back to the step S1412 and is then able to determine whether a response message is received from the GDB. If the timer expires, the STA goes to a step S1430 and then performs an operating mode switching. In particular, after the STA has sent a message to the GDB, if the GDB does not respond within a prescribed time, it is able to determine that a GDB access is impossible. If the GDB access is impossible, since it is unable to check whether the available channel information acquired or stored by the corresponding STA is valid at a current timing point, an operation based on the corresponding available channel information should not be allowed. Moreover, in case that the corresponding STA provides the available channel information to a different dependent STA, since the different dependent STA will have an inaccurate available channel information, it should not be allowed as well. Therefore, the STA operating in the enabling STA mode in the step S1410 should enter a dependent STA mode if the GDB access is impossible.

Through the above steps S1411 to S1413, it is able to continuously monitor whether the GDB access capability of the STA is enabled. If the GDB access is impossible, the operating mode is switched to the dependent STA mode to prevent incorrect operations on a white space band.

On the other hand, in a step S1421, the STA currently operating in the enabling STA mode in the step S1410 is able to determine whether a check period of a geo-location decision accuracy arrives. The accuracy of the geo-location decision of the STA can be checked in accordance with a prescribed period. In this case, it is able to determine the prescribed period based on a mobility of the STA or a regulation. For instance, in case of an STA having high mobility, the prescribed period can be set to check the accuracy of the geo-location decision more frequently. For another instance, a minimum period can be set by the regulation to check the accuracy of the geo-location decision. If it is determined to check the accuracy of the geo-location decision in the step S1421, the STA goes to a step S1422. Otherwise, the STA can keep operating as the enabling STA in the step S1410.

In the step S1422, the STA can determine whether the accuracy of its geo-location decision is equal to or greater than a prescribed threshold. In this case, the prescribed threshold may be determined in advance by the regulation. Since the present invention assumes that the location decision is made by an arbitrary method, a method of calculating the accuracy of the location decision is assumed as following a prescribed method given by a system. In particular, the accuracy of the location decision can be calculated in various ways and a detailed decision method does not pertain to the scope of the present invention. For instance, the accuracy of the location decision can be determined with reference to resolution. And, a level of the accuracy can be determined depending on a GPS-only dependent method or an AP location considered method.

If the accuracy of the location decision is equal to or greater than the prescribed threshold in the step S1422, the STA goes back to the step S1421 and is then able to determine whether the check period of the location decision accuracy arrives. If the accuracy of the location decision is smaller than the prescribed threshold (this includes disablement of the geo-location decision capability of the corresponding STA), the STA goes to the step S1430 and then performs the operating mode switching. In particular, if the accuracy of the location decision of the STA is low, since the available channel information determined on the basis of the corresponding location cannot be considered as accurate, an operation based on the corresponding available channel information should not be allowed. Moreover, in case that the corresponding STA provides the available channel information to a different dependent STA, since the different dependent STA will have an inaccurate available channel information, it should not be allowed as well. Therefore, the STA operating in the enabling STA mode in the step S1410 should enter a dependent STA mode if the GDB access is impossible.

Through the above steps S1421 and S1422, it is able to continuously monitor the accuracy of the location decision of the STA. if the accuracy of the location decision is equal to or lower than a level required by a system or the location decision capability is disabled, the operating mode is switched to the dependent STA mode to prevent incorrect operations on a white space band.

The step S1430 of switching the operating mode of the STA can be performed through the step S1413 or the step S1422. A switching (or demotion) to the dependent STA mode from the enabling STA mode can include at least one of the following steps. For instance, it is able to stop serving (or deassociate) all STAs used to be served (or associated with) in the course of operating in the enabling STA mode in the step S1410. And, it is able to disable or drop a beacon frame, a probe response frame, an enablement response frame and the like, which used to be transmitted in the course of the operation in the enabling STA mode in the step S1410. Moreover, while the STA operates in the enabling STA mode in the step S1410, if the STA operates as a group owner for Wi-Fi Direct, it is able to disconnect all W-Fi Direct connections.

Besides, in case that an STA previously operating in a dependent STA mode is an STA (e.g., a fixed device, a Mode II device, etc.) retaining capability of operating as an enabling STA originally, if a prescribed condition is met, the corresponding STA can enter the enabling STA mode again. For instance, if a message is received from a GDB and an accuracy of a location decision is restored to a value equal to or greater than a prescribed threshold, the corresponding STA can operate in the enabling STA mode. In doing so, the corresponding STA can be set not to enter the enabling STA mode again if the message is received from the GDB or the accuracy of the location decision is determined as equal to or greater than the prescribed threshold. In particular, the STA can be set to enter the enabling STA mode only if both of the two conditions are met.

The contents and/or items explained in the above descriptions of the various embodiments of the present invention may be independently applicable or at least two embodiments of the present invention may be simultaneously applicable.

Figure 15:
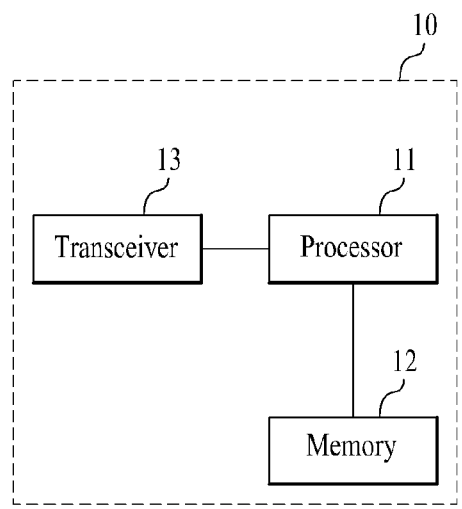
FIG. 15 is a block diagram for a configuration of a wireless device according to one embodiment of the present invention.

FIG. 15 is a block diagram for a configuration of a wireless device according to one embodiment of the present invention.

An STA 10 may include a processor 11, a memory 12 and a transceiver 13. The transceiver 13 can transmit and receive radio signals and is able to implement a physical layer according to IEEE 802 system for example. The processor 11 is connected to the transceiver 13 and is able to implement a physical layer and/or a MAC layer according to IEEE 802 system. The processor 11 can be configured to perform operations according to the various embodiments of the present invention mentioned in the above description. And, a module for implementing operations of the STA according to the various embodiments of the present invention mentioned in the foregoing description are saved in the memory 12 and can be executed by the processor 11. The memory 12 is included in the processor 11 or installed outside the processor 11 and is then connected to the processor 11 via a means known to the public.

The STA device 10 according to one embodiment of the present invention can be configured to switch an operating mode of a station (STA) on a whitespace band.

If the STA 10 operates in a first operating mode, the processor 11 can be configured to initiate a timer related to a database access. The processor 11 can be configured to determine whether a message is received from the database through the transceiver 13 in the course of the timer operation. If the message is not received from the database via the transceiver 13 but the timer expires, the processor 11 can be configured to enter a second operating mode. And, the processor 11 can be configured to determine whether an accuracy of a geo-location decision of the STA 10 is equal to or greater than a prescribed threshold. Moreover, the processor 11 can be configured to enter the second operating mode if the accuracy of the geo-location decision is smaller than the prescribed threshold. In this case, the first operating mode may correspond to the aforementioned enabling STA mode and the second operating mode may correspond to the aforementioned dependent STA mode.

In the above-mentioned detailed configurations of the STA device 10, the contents or items explained in the descriptions of the various embodiments of the present invention may be independently applicable or at least two embodiments of the present invention may be simultaneously applicable. And, redundant descriptions shall be omitted from the following description for clarity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein but intends to give a broadest scope matching the principles and new features disclosed herein.

INDUSTRIAL APPLICABILITY

The embodiments of the present invention mentioned in the foregoing description are mainly explained with reference to IEEE 802.11 system and may be applicable in the same manners to various kinds of mobile communication systems.

What is claimed is:

1. A method of switching an operating mode of a station (STA) on a whitespace band, the method comprising:
   initiating a timer related to an access to a database when the STA operates in a first operating mode and sends a first message to the database;
   determining whether a second message is received from the database while the timer is running; and
   if the second message is not received from the database and the timer expires, switching the operating mode to a second operating mode,
   wherein the STA operated in the second operating mode is changed to the first operating mode and the timer is re-initiated when the STA receives the second message from the database and an accuracy of a geo-location of the STA is equal to or greater than a prescribed threshold.

2. The method of claim 1, wherein the message sent to the database includes a channel availability query (CAQ) request frame.

3. The method of claim 1, wherein the message received from the database includes a CAQ response frame.

4. The method of claim 3, wherein the CAQ response frame includes a whitespace map (WSM).

5. The method of claim 1, wherein if the accuracy of the geo-location is lower than the prescribed threshold, the operating mode is switched to the second operating mode.

6. The method of claim 1, wherein the determination of the accuracy of the geo-location is performed by a prescribed period.

7. The method of claim 6, wherein the prescribed period is determined based on a mobility of the STA.

8. The method of claim 1, wherein the first operating mode is an operating mode for allowing to perform at least one of providing available channel information or providing an enablement signal to another STA.

9. The method of claim 1, wherein the second operating mode is an operating mode for allowing a signal transmission on the whitespace band by receiving available channel information from another STA or by a control from the another STA.

10. The method of claim 1, wherein the switching to the second operating mode comprises at least one of deassociation for all STAs, stopping transmissions of a beacon frame, a probe response frame and an enablement response frame, and disconnecting Wi-Fi Direct connection.

11. The method of claim 1, wherein the database stores available channel information on the whitespace band.

12. A station (STA) device for switching an operating mode of a station (STA) on a whitespace band, comprising:
   a transceiver configured to perform transceiving with a different STA; and
   a processor configured to:
      control the STA device including the transceiver;
      initiate a timer related to an access to a database if the STA operates in a first operating mode and sends a first message using the transceiver;
      determine whether a second message is received from the database while the timer is running;
      if the second message is not received from the database and the timer expires, switching the operating mode to a second operating mode,
      wherein the STA operated in the second operating mode is changed to the first operating mode and the timer is re-initiated when the STA receives the second message from the database and an accuracy of a geo-location of the STA is equal to or greater than a prescribed threshold.

* * * * *